(12) United States Patent
Osawa

(10) Patent No.: US 10,852,048 B2
(45) Date of Patent: Dec. 1, 2020

(54) MULTILAYER PIPE COOLING COLD STORAGE

(71) Applicant: CHUON CO., LTD., Matsuyama (JP)

(72) Inventor: Kunio Osawa, Matsuyama (JP)

(73) Assignee: CHUON CO., LTD., Matsuyama (JP)

( * ) Notice: Subject to any disclaimer, the term of this patent is extended or adjusted under 35 U.S.C. 154(b) by 38 days.

(21) Appl. No.: 16/331,481

(22) PCT Filed: Mar. 22, 2017

(86) PCT No.: PCT/JP2017/011315
§ 371 (c)(1),
(2) Date: Mar. 7, 2019

(87) PCT Pub. No.: WO2018/047387
PCT Pub. Date: Mar. 15, 2018

(65) Prior Publication Data
US 2019/0219322 A1    Jul. 18, 2019

(30) Foreign Application Priority Data

Sep. 8, 2016  (JP) .................................. 2016-175691
Feb. 21, 2017 (JP) .................................. 2017-030383

(51) Int. Cl.
*F25D 17/02*    (2006.01)
*F25D 9/00*     (2006.01)
(Continued)

(52) U.S. Cl.
CPC ............... *F25D 17/02* (2013.01); *F25D 9/00* (2013.01); *F25D 17/06* (2013.01); *F28D 7/10* (2013.01);
(Continued)

(58) Field of Classification Search
CPC . F25D 3/02; F25D 17/02; F25D 3/005; F25D 9/00; F28D 7/10; F28D 20/0034; F28F 23/02
See application file for complete search history.

(56) References Cited

U.S. PATENT DOCUMENTS 3,180,108 A    4/1965  Rhodes
3,280,586 A    10/1966 Funakoshi
(Continued)

FOREIGN PATENT DOCUMENTS

CN    1506647 A    6/2004
CN    1831462 A    9/2006
(Continued)

OTHER PUBLICATIONS

International Search Report dated Jun. 13, 2017 from International Application No. PCT/JP2017/011315, 6 pages, including English translation.
(Continued)

*Primary Examiner* — Cassey D Bauer
(74) *Attorney, Agent, or Firm* — MH2 Technology Law Group, LLP

(57) ABSTRACT

A cold storage box 1 comprises a housing 2 internally having a storage space S for a cold storage object, and one or more heat exchanger tubes 3 provided in the storage space S; wherein the heat exchanger tubes 3 are each a multilayer tube comprising an outer tube with thermal conductivity having an outer surface facing the storage space S, and as inner tube provided inside the outer tube; a first brine solution that does not freeze at 0° C. is contained between the outer tube and the inner tube; and a refrigerant, or a second brine solution that does not freeze at 0° C. is contained inside the inner tube.

5 Claims, 14 Drawing Sheets

(51) Int. Cl.
*F28F 1/32* (2006.01)
*F28D 7/14* (2006.01)
*F28F 23/02* (2006.01)
*F28D 7/10* (2006.01)
*F25D 17/06* (2006.01)
*F28D 20/00* (2006.01)
*F28D 21/00* (2006.01)
*F25D 29/00* (2006.01)

(52) U.S. Cl.
CPC ............... *F28D 7/103* (2013.01); *F28D 7/14* (2013.01); *F28F 1/325* (2013.01); *F28F 23/02* (2013.01); *F25D 29/00* (2013.01); *F28D 20/0034* (2013.01); *F28D 2021/0042* (2013.01)

(56) References Cited

U.S. PATENT DOCUMENTS

| | | | |
|---|---|---|---|
| 3,861,162 | A | 1/1975 | Horton et al. |
| 4,800,729 | A | 1/1989 | Hara |
| 2005/0051310 | A1 | 3/2005 | Inoue et al. |
| 2013/0008202 | A1* | 1/2013 | Lee .................. F25D 17/02 62/376 |
| 2013/0068606 | A1* | 3/2013 | Lahnstein ............ B01F 7/00241 202/175 |
| 2013/0133873 | A1* | 5/2013 | Campbell .......... H05K 7/20281 165/281 |

FOREIGN PATENT DOCUMENTS

| | | |
|---|---|---|
| CN | 203037108 U | 7/2013 |
| CN | 204923993 U | 12/2015 |
| DE | 2521757 A1 | 11/1976 |
| EP | 0664426 A1 | 7/1995 |
| JP | S49-38948 Y1 | 10/1974 |
| JP | S52-39848 A | 3/1977 |
| JP | S60-49740 A | 3/1985 |
| JP | S61-106792 U | 7/1986 |
| JP | S63-58079 A | 3/1988 |
| JP | H5-296631 A | 11/1993 |
| JP | H07-91672 B2 | 10/1995 |
| JP | H8-116869 A | 5/1996 |
| JP | 2004-354007 A | 12/2004 |
| JP | 2005-9832 A | 1/2005 |
| JP | 2006-046888 A | 2/2006 |

OTHER PUBLICATIONS

Extended European Search Report dated Apr. 21, 2020 for corresponding European Patent Application No. 17848334.3, 8 pages.
Office Action dated Jun. 16, 2020 for corresponding Chinese Patent Application No. 201780039813.3, 11 pages with machine translation.

* cited by examiner (a)

(b)

MULTILAYER PIPE COOLING COLD STORAGE

CROSS-REFERENCE TO RELATED APPLICATIONS

This application is a U.S. National Stage application of PCT/JP2017/011315 filed 22 Mar. 2017, which claims priority to Japanese Application No. 2016-175691 filed 8 Sep. 2016 and Japanese Application No. 2017-030383 filed 21 Feb. 2017, the entire disclosures of which are incorporated herein by reference.

TECHNICAL FIELD

The present invention relates to a cold storage box that can store a cold storage object at less than 0° C. without freezing it.

BACKGROUND ART

For example, when cold storage objects, such as foods (e.g., fresh vegetables, as well as seafood and livestock products that require aging), and organs and blood for transplantation, are cooled to a temperature less than 0° C., the quality maintenance time of the cold storage objects can be extended. It is known that the quality maintenance time is logarithmically extended at a lower temperature. However, when attempts were made to maintain the cold storage temperature at around freezing by electrical control, the temperature would became unstable, and the tissue of the cold storage object would become frozen and damaged, which significantly lowered its quality, and so there was a risk that the cold storage object would become unusable. Further, constantly maintaining the temperature at the critical freezing temperature by electrical control required highly accurate control, which led to a drawback that expensive electric control units were required. Therefore, a common method to prevent freezing was to maintain the cold storage temperature higher than the critical freezing temperature.

In contrast, PTL 1 discloses a method for preserving a perishable food by dipping it in preserving water at −2° C. to 0° C. Further, PTL 2 discloses a method for preserving a perishable food by cooling treatment with ultra-low-temperature water maintained in a non-frozen state at 0° C. or less.

However, the invention disclosed in PTL 1 has a defect that it is troublesome to remove water from the storage object, which will have gotten wet, after storage. Moreover, the invention disclosed in PTL 2 has a defect that the temperature becomes too low, and so the freshness of the perishable food decreases.

CITATION LIST

Patent Literature

PTL 1: JPS60-49740A
PTL 2: JPH08-116869A

SUMMARY OF INVENTION

Technical Problem

The inventor invented a cold storage box according to the present invention as a means for easily solving the above problems.

An object of the present invention is to provide a cold storage box that can easily store a cold storage object at less than 0° C. without freezing it.

Solution to Problem

The cold storage box according to the present invention comprises:
a housing internally having a storage space for a cold storage object, and
one or more heat exchanger tubes provided in the storage space;
wherein the one or more heat exchanger tubes are each a multilayer tube comprising:
an outer tube with thermal conductivity having an outer surface facing the storage space, and
an inner tube provided inside the outer tube;
a first brine solution that does not freeze at 0° C. is contained between the outer tube and the inner tube; and
a refrigerant, or a second brine solution that does not freeze at 0° C., is contained inside the inner tube.

In the cold storage box according to the present invention, it is preferable that the inner tube is formed from a material selected from cold-resistant rubber, plastics, foamed resins, ceramics, glass, or these materials coated with copper, titanium, stainless steel, aluminum, or an aluminum alloy; or that the inner tube has a multilayer structure having an air layer therein.

The cold storage box according to the present invention may further comprise at least one middle tube between the outer tube and the inner tube.

The cold storage box according to the present invention preferably further comprises a thermometer for measuring the temperature of the first brine solution, and a control means for controlling the temperature of the second brine solution or the refrigerant based on the measured temperature.

In the cold storage box according to the present invention, the material, thickness, and heat transfer area of the inner tube are preferably set so that the first brine solution does not completely freeze.

The cold storage box according to the present invention preferably further comprises multiple plate-like fins provided in the storage space;
wherein the one or more heat exchanger tubes penetrate the plate-like fins.

The cold storage box according to the present invention preferably further comprises a blowing means for blowing air in the storage space between the plate-like fins.

The cold storage box according to the present invention preferably further comprises one or more plates facing the inner surface of the housing;
wherein the one or more heat exchanger tubes and the plate-like fins are provided between the inner surface and the plates.

In the cold storage box according to the present invention, one or more slits are preferably formed in the one or more plates.

The cold storage box according to the present invention comprises:
a housing internally having a storage space for a cold storage object,
one or more first heat exchanger tubes provided in the storage space and containing a third brine solution,
a brine tank containing the third brine solution supplied to the first heat exchanger tubes, and one or more second heat exchanger tubes provided in the brine tank;

wherein the second heat exchanger tubes are each a multilayer tube comprising:

an outer tube with thermal conductivity having an outer surface facing the third brine solution, and an inner tube provided inside the outer tube;

a first brine solution that does not freeze at 0° C. is contained between the outer tube and the inner tube; and a refrigerant, or a second brine solution that does not freeze at 0° C., is contained inside the inner tube.

The cold storage box according to the present invention preferably further comprises multiple plate-like fins provided in the storage space;

wherein the one or more first heat exchanger tubes penetrate the plate-like fins.

The cold storage box according to the present invention preferably further comprises a blowing means for blowing air in the storage space between the plate-like fins.

Advantageous Effects of Invention

The present invention can provide a cold storage box that can easily store a cold storage object at less than 0° C. without freezing it.

BRIEF DESCRIPTION OF DRAWINGS

In FIG. 2, casters 7 are omitted.

DESCRIPTION OF EMBODIMENTS

Embodiment of the present invention are described below with reference to the attached drawings. Note that the present invention is not limited to the following embodiments.

Figure 1:
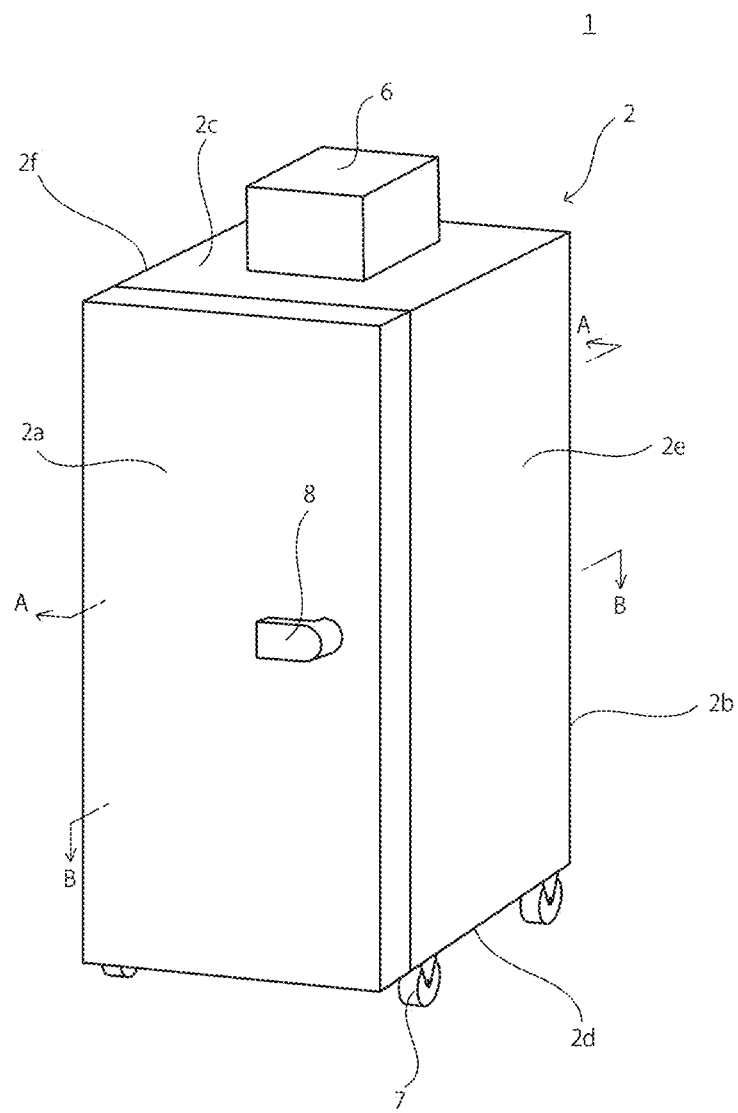
FIG. 1 is a perspective view of a cold storage box according to one embodiment of the present invention.
Figure 2:
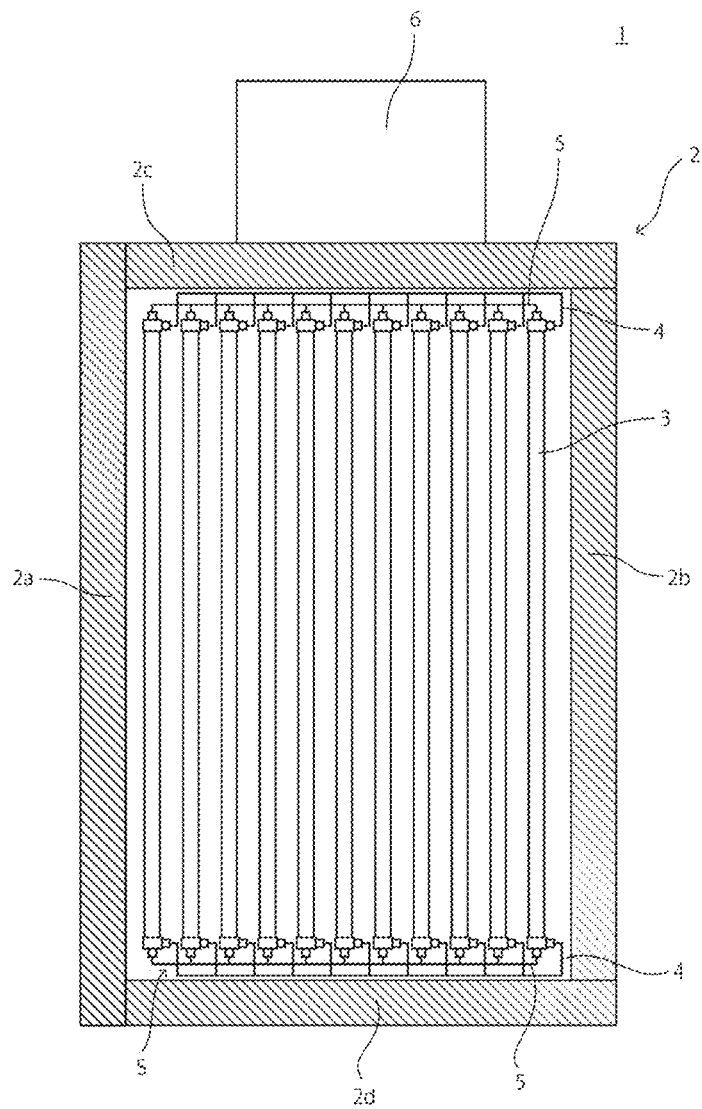
FIG. 2 is an A-A cross-sectional view (vertical cross-sectional view) of FIG. 1.
Figure 3:
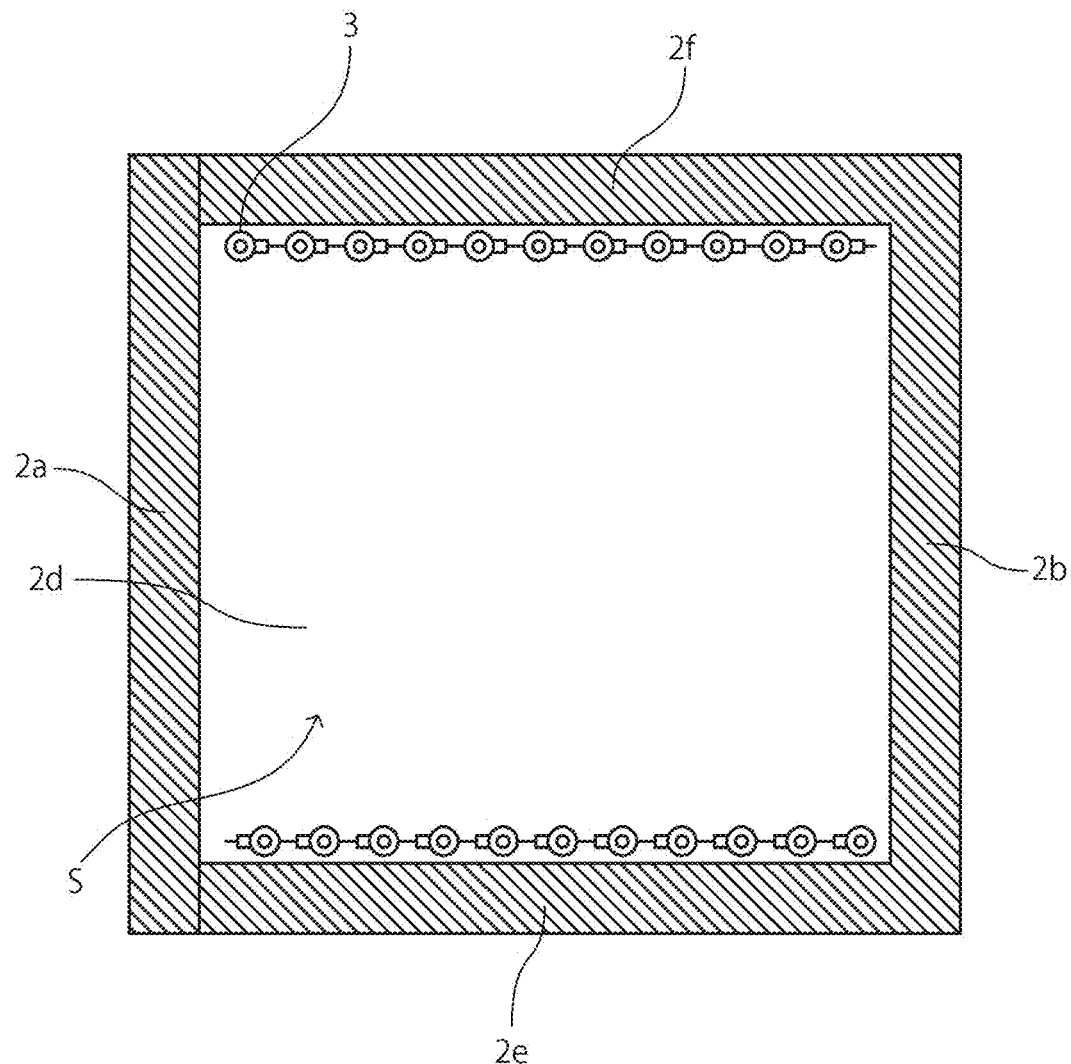
FIG. 3 is a B-B cross-sectional view (horizontal cross-sectional view) of FIG. 1.

FIG. 1 shows the appearance of a cold storage box 1 according to one embodiment of the present invention, and FIGS. 2 and 3 show the internal structure of the cold storage box 1.

The cold storage box 1 comprises at least a housing 2 internally having a storage space S for a cold storage object, and heat exchanger tubes 3 provided in the storage space S. Although the shape of the housing 2 is not limited, the housing 2 of the present embodiment has a rectangular box shape, and the inner side of the walls that form the outer shape of the housing 2 is the storage space S. In order to increase the storage capacity, multiple shelves may be provided in the storage space S. The size of the storage space S with respect to the housing 2 is not limited. The cold storage object stored in the storage space S can maintain its quality for a long period of time in such a manner that it is stored at less than 0° C. without becoming frozen. Examples include perishable foods, such as fresh vegetables, seafood, and livestock products; and organs, vitals, and blood for transplantation. In the cold storage box 1, a refrigerator 6 that supplies a refrigerant to the heat exchanger tubes 3 is provided on the housing 2.

The walls that form the outer shape of the housing 2 consist of a front side wall 2*a* and a rear side wall 2*b* that face each other, an upper side wall 2*c* and a bottom side wall 2*d* that face each other, and a right side wall 2*e* and a left side wall 2*f* that face each other. These walls 2*a* to 2*f* are preferably formed from materials having insulation properties. In the present embodiment, these walls are formed from, for example, formed resins, such as thermal barrier aluminum-coating foamed resins and foamed polystyrene; fiber-reinforced plastics (FRP), insulated walls with a vacuum inside, and like materials having insulation properties. Four casters 7 are attached to the bottom side wall 2*d* so that the cold storage box 1 is wheeled. The front side wall 2*a* is a door for opening the storage space S, and is attached to the left side wall 2*f* so as to be able to open and close by a known means (not shown). A handle 8 for opening and closing is provided on the outer surface of the front side wall 2*a*.

As shown in FIGS. 2 and 3, multiple heat exchanger tubes 3 are provided in lines along the inner surfaces of the right side wall 2*e* and left side wall 2*f*. The heat exchanger tubes 3 perform heat exchange with air in the storage space S, so that the inside of the storage space S is cooled and maintained at a temperature less than 0° C. The number of heat exchanger tubes 3 is not limited, and is suitably determined in consideration of the size of the storage space S, the efficiency of heat exchange, etc. Both ends of each heat exchanger tube 3 are connected to a brine solution supply pipe 4 and a refrigerant supply pipe 5. The installation positions of the heat exchanger tubes 3 are not limited within the storage space S. For example, the heat exchanger tubes 3 may be provided along the inner surface of the rear side wall 2*b* or the upper side wall 2*c*.

Figure 4:
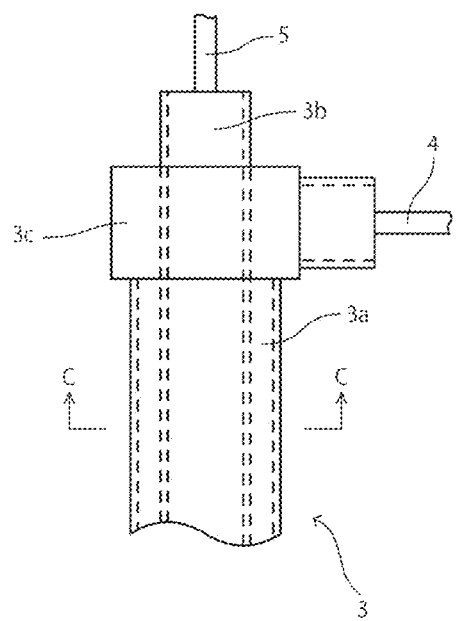
FIG. 4 (*a*) is a partial enlarged view of the edge of a heat exchanger tube, and FIG. 4 (*b*) is a C-C cross-sectional view of the heat exchanger tube.
Figure 4:
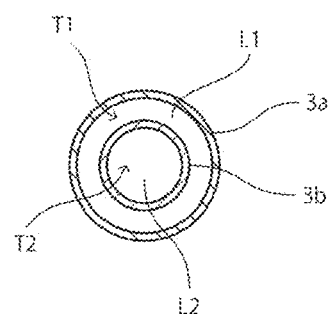

FIG. 4 (*a*) is a partial enlarged view of the edge of the heat exchanger tube 3, and FIG. 4 (*b*) is a cross-sectional view of the heat exchanger tube 3. The heat exchanger tube 3 is a multilayer tube comprising an outer tube 3*a* and an inner tube 3*b*. The outer tube 3*a* has an outer surface facing the storage space S, and is formed from a material having thermal conductivity. The inner tube 3*b* has a diameter smaller than that of the outer tube 3*a*, and is provided inside the outer tube 3*a*.

As shown in FIG. 4 (*b*), a first brine solution L1 is contained in a region T1 between the outer tube 3*a* and the inner tube 3*b*. The brine solution is a non-freezing solution having a freezing point of less than 0° C. Moreover, a refrigerant L2 is contained in a region T2 inside the inner tube 3b. A second brine solution may be contained, in place of the refrigerant L2.

As shown in FIG. 4 (a), both ends of the outer tube 3a are connected to the brine solution supply pipe 4 through a connecting member 3c. The brine solution supply pipe 4 is attached to a circulation pump (not shown). The brine solution L1 supplied to one end of the outer tube 3a from the circulation pump through the brine solution supply pipe 4 is discharged from the other end of the outer tube 3a through the space between the outer tube 3a and the inner tube 3b, and is returned to the circulation pump through the brine solution supply pipe 4. It is not essential to circulate the brine solution L1; it is at least necessary to fill the space between the outer tube 3a and the inner tube 3b with the brine solution L1. The structure of the connecting member 3c is not limited, as long as the structure can pour the brine solution L1 into the space between the outer tube 3a and the inner tube 3b so that it is no leaked.

Moreover, both ends of the inner tube 3b are connected to the refrigerant supply pipe 5. The refrigerant supply pipe 5 is covered with a heat-insulating material and is connected to the refrigerator 6 shown in FIGS. 1 and 2. The refrigerant L2 supplied to one end of the inner tube 3b from the refrigerator 6 through the refrigerant supply pipe 5 is discharged from the other end of the inner tube 3b through the inside of the inner tube 3b, and is returned to the refrigerator 6 through the refrigerant supply pipe 5. While the refrigerant L2 is flowing through the inside of the inner tube 3b, heat exchange with the brine solution L1 is performed, and the brine solution L1 is cooled to 0° C. or less. Although the heat-transfer coefficient of the inner tube 3b is not limited, the inner tube 3b of the present embodiment is formed from a material with a high heat-transfer coefficient, and can be formed from copper, titanium, stainless steel, aluminum, an aluminum alloy, or like material. The inner tube 3b may have a single-layer structure or a multilayer structure.

The brine solution L1 contained between the outer tube 3a and the inner tube 3b is an aqueous solution that does not freeze at 0° C., but freezes at a predetermined temperature less than 0° C. The freezing temperature of the brine solution L1 may be equal to or less than the preset cold storage temperature of the storage object, i.e., the preset temperature of the storage space S. In the present embodiment, the brine solution L1 is an aqueous solution that freezes at a temperature of less than 0° C. to −5° C. For example, it is possible to use aqueous solutions in which salts, organic acid salts, sugars, or organic solvents, such as alcohols, are dissolved; however, the freezing temperature of the brine solution L1 is not limited thereto. The solute of the brine solution L1 is not limited, as long as it can lower the freezing point of water. Preferable examples are those that do not adversely affect human bodies. For example, salts, alcohols, sucrose, etc., can be used. The freezing temperature of the brine solution L1 can be set to a desired temperature by adjusting the solute concentration.

When the brine solution L1 is a salt water solution, the salt used as the solute is not limited, as long as it is not harmful to human bodies. Examples include sodium chloride, calcium chloride, phosphate, sulfite, and the like. Moreover, the salt concentration of the brine solution L1 is not limited, as long as the freezing temperature of the brine solution L1 is equal to or less than the preset temperature of the storage space S. In the present embodiment, for example, when the brine solution L1 is ethanol, the salt concentration is 2.3 wt % (freezing point: −0.1° C.) to 12.9 wt % (freezing point: −5.0° C.).

The refrigerant L2 contained inside the inner tube 3b is not limited, as long as it can cool the brine solution L1 to a temperature equal to or less than the preset temperature of the storage space S. For example, ammonia, carbon dioxide, etc. that are chlorofluorocarbon alternative refrigerants can be used. The installation position of the refrigerator 6 that supplies the refrigerant L2 is not limited. For example, the refrigerator 6 may be attached to the outer surface of the rear side wall 2b, right side wall 2e, or left side wall 2f of the housing 2.

When a second brine solution is used in place of the refrigerant L2, the second brine solution is not limited, as long as it can cool the brine solution L1 to a temperature equal to or less than the preset temperature of the storage space S. The second brine solution may be the same or different from the brine solution L1.

The cold storage box 1 comprises a thermometer (not shown) for measuring the temperature of the first brine solution. The installation position of the thermometer is not limited.

The refrigerator 6 comprises a built-in controller (control means) for controlling the operation of the refrigerator 6. In the present embodiment, the thermometer can transmit the measured temperature of the brine solution L1 to the controller from the main body by wire or by wireless communication (wireless communication in FIG. 2). The controller controls the operating state of the refrigerator 6 based on the measured temperature to thereby control the temperature of the refrigerant L2 supplied to the inner tube 3b. The temperature of the storage space S may be measured with a thermometer, and the controller may control the operating state of the refrigerator 6 based on the measured temperature.

A method for cold storage of a storage object in the above cold storage box 1 is described. In the following, the preset cold storage temperature of the storage object is −1.0° C. The freezing temperature of the brine solution L1 is less than −1.0° C. The temperature of the refrigerant L2 is not limited, as long as it is less than −1.0° C.

First, while the brine solution L1 is contained between the outer tube 3a and the inner tube 3b, a storage object is placed in the storage space S, and the front side wall 2a, which is a door, is closed.

Subsequently, the refrigerator 6 is operated, and a refrigerant is supplied to a refrigerant coil inside the inner tube 3b. Heat exchange is thereby performed between the refrigerant L2 and the brine solution L1 through the inner tube 3b, and the brine solution L1 is cooled to a temperature less than 0° C.

Thereafter, when the temperature of the brine solution L1 measured with a thermometer reaches −1.0° C., which is the preset cold storage temperature of the storage object, the controller of the refrigerator 6 stops supply of the refrigerant L2 from the refrigerator 6. Cooling of the brine solution L1 is thereby stopped.

Because the outer tube 3a is formed from a material with a high heat-transfer coefficient, heat exchange is quickly performed between the brine solution L1 and the air in the storage space S, so that the temperature of the storage space S becomes almost equal to the temperature of the brine solution L1. The internal temperature of the storage space S thereby becomes −1.0° C.

Thereafter, when the temperature of the brine solution L1 is increased to −0.5° C., for example, the controller of the refrigerator 6 operates the refrigerator 6 to restart supply of the refrigerant L2. Then, when the temperature of the brine solution L1 reaches −1.0° C., the controller of the refrigerator 6 stops the refrigerator 6. Subsequently, the refrigerator 6 repeats the cycle of operation and stops of the refrigerator 6, based on the temperature of the brine solution L1.

Thus, in the present embodiment, the inside of the storage space S is cooled with the brine solution L1 cooled to a desired temperature less than 0° C. Moreover, compared with the air in the storage space S, which has temperature variation depending on the position, the brine solution L1 has less temperature variation; thus, the temperature of the brine solution L1 can be accurately adjusted to any temperature equal to or more than the freezing temperature and less than 0° C. Therefore, the cold storage object can be easily stored at less than 0° C. without becoming frozen. Moreover, in the process of transmitting cold energy from the inner tube 3b to the outer tube 3a, and transmitting cold energy from the surface of the outer tube 3a to the storage space S, a difference in temperature transmission rate is made between the brine solution L1 and the tube wall, and the rates interfere with each other, thereby reducing the wave of temperature changes. There is thus no variation in the temperature of the storage space S due to the ON/OFF temperature control of the refrigerant L2, and the inside of the storage space S can be maintained at a stable temperature. Accordingly, highly accurate temperature control can be easily achieved.

In the present embodiment, the temperature of the refrigerant L2 is set to about −1.0° C., which is the preset cold storage temperature of the storage object; however, the temperature of the refrigerant L2 may be set to an even lower temperature (e.g., −10° C.). This can extend the cold-storage retention time after power supply to the cold storage box 1 is stopped. In this case, the inner tube 3b is preferably formed from a material that can have heat transference adjusted so that the brine solution L1 does not freeze. Examples of such materials include cold-resistant rubber, plastics, foamed resins, ceramics, glass, and these materials covered with copper, titanium, stainless steel, aluminum, an aluminum alloy, or the like. Further, the inner tube 3b may be covered with a material having high heat transference, and may be adjusted so that the heat transfer area of the inner tube 3b is reduced. Moreover, in order to reduce the heat transference of the inner tube 3b, the inner tube 3b may have a multilayer structure having an air layer therein, as with double-pane glass. When the material, thickness, and heat transfer area of the inner tube 3b are set (controlled) as described above, the heat transfer rate of the inner tube 3b can be adjusted, the cold storage ability of the refrigerant L2 can be increased, and the brine solution L1 can be prevented from becoming completely frozen.

As described above, in the cold storage box 1 according to the present embodiment, the air in the storage space S can be heat-exchanged through the surface of the heat exchanger tubes 3. Therefore, for example, compared with a structure that performs heat exchange through the walls of the storage space S, the area of heat exchange can be enlarged; thus, the air in the storage space S can be efficiently cooled.

The cold storage box 1 has a structure in which the front side wall 2a of the housing 2 can be opened and closed; however, the present invention is not limited thereto, as long as the structure comprises at least a housing internally having a storage space for a cold storage object. For example, the upper side wall 2c may be configured to be able to open and close, or to be removable.

Figure 5:
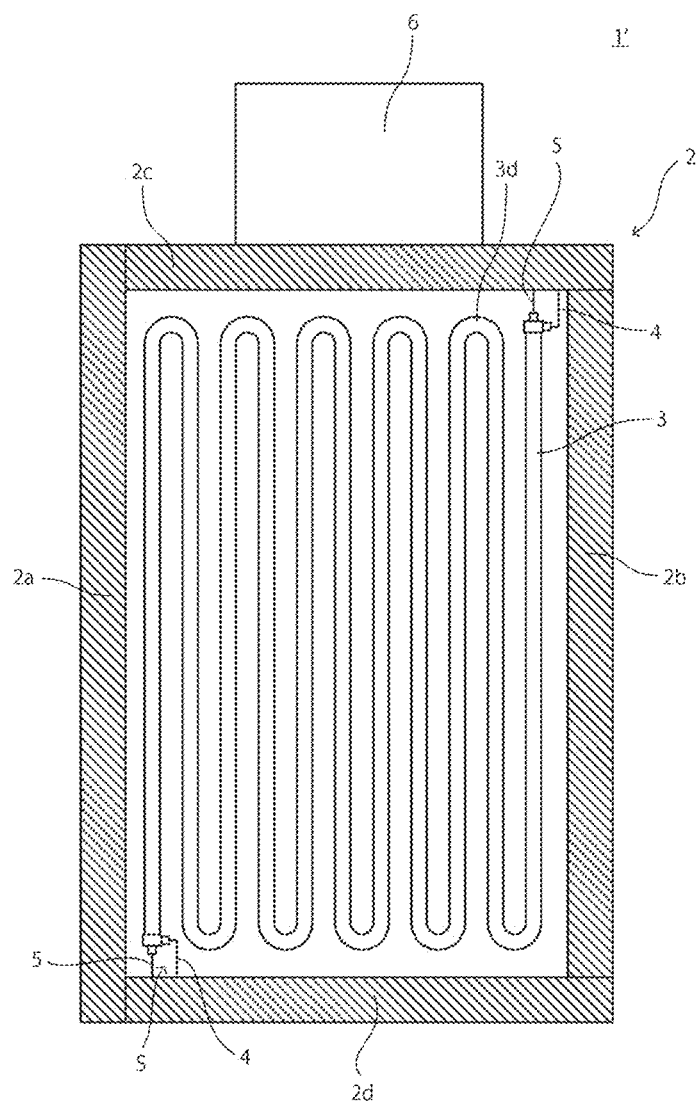
FIG. 5 is a vertical cross-sectional view of a cold storage box according to a modified example of the embodiment of the present invention.

In the present embodiment, the heat exchanger tubes 3 are arranged so that their axial direction is vertical; however, there is no limitation thereto. For example, the heat exchanger tubes 3 may be arranged so that their axial direction is horizontal. Moreover, in the present embodiment, the heat exchanger tubes 3 are connected in parallel; however, they may be connected in series, as in a cold storage box 1' shown in FIG. 5. In FIG. 5, the heat exchanger tubes 3 are connected to each other through semicircular arc-shaped curved portions 3d, and extend in the transverse direction of the cold storage box 1' while meandering as a whole.

Figure 6:
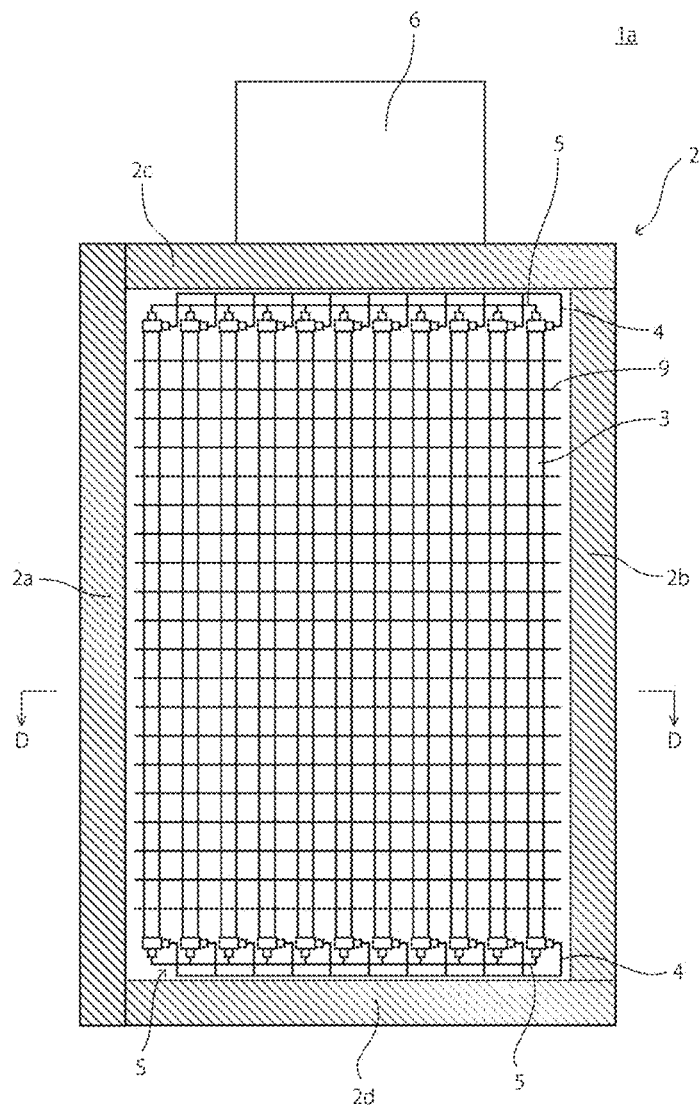
FIG. 6 is a vertical cross-sectional view of a cold storage box according to another embodiment of the present invention.
Figure 7:
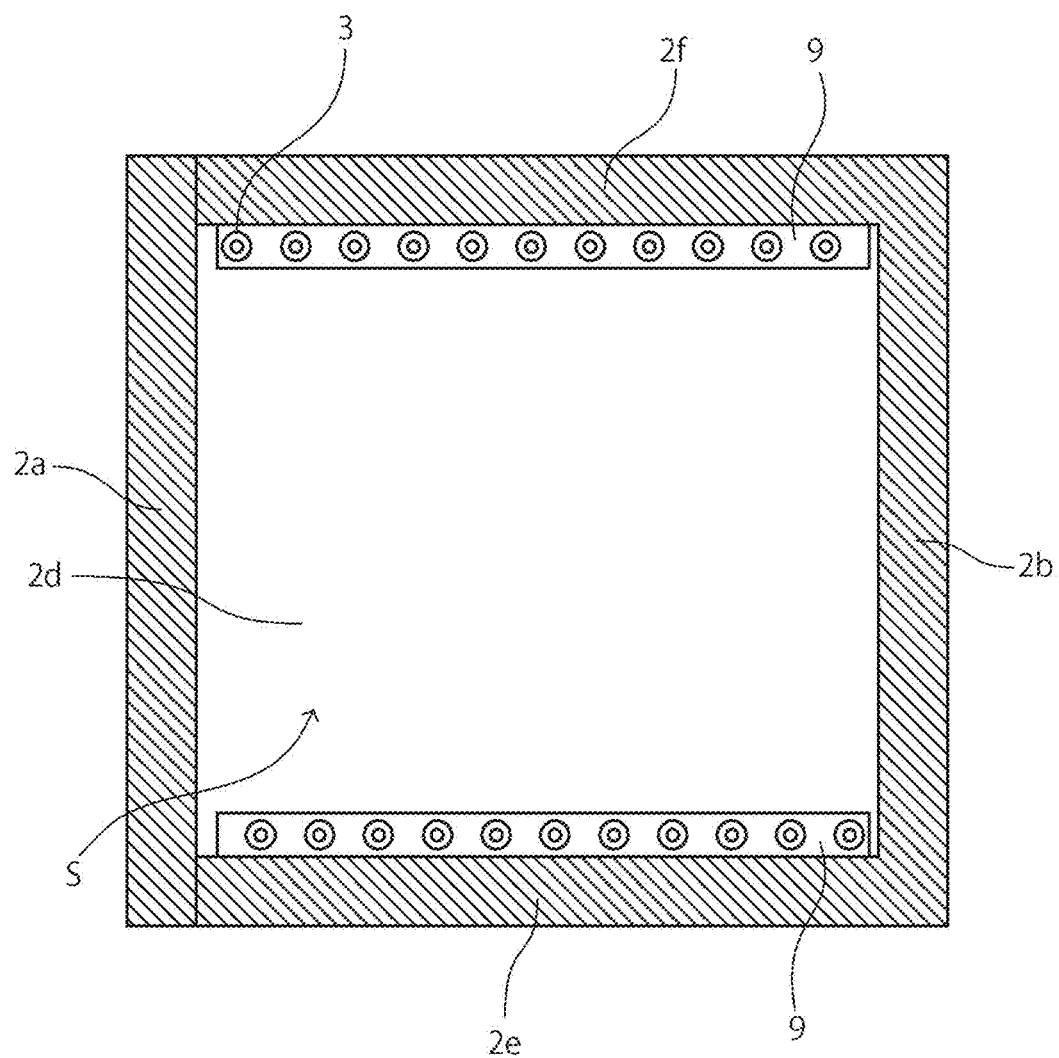
FIG. 7 is a D-D cross-sectional view (horizontal cross-sectional view) of FIG. 6.

Next, another embodiment of the present invention is described. FIGS. 6 and 7 show the internal structure of a cold storage box 1a according to another embodiment of the present invention. The basic structure of the cold storage box 1a shown in FIGS. 6 and 7 is the same as the structure of the cold storage box 1 shown in FIGS. 2 and 3. The corresponding structures are assigned the same reference signs, and detailed description of them is omitted.

The cold storage box 1a of the present embodiment has a structure of the cold storage box 1 shown in FIGS. 2 and 3 further comprising multiple plate-like fins 9. Each plate-like fin 9 has a long thin plate shape extending in the horizontal direction of the cold storage box 1a. The multiple plate-like fins 9 are attached at predetermined intervals to the right side wall 2e and the left side wall 2f so that their main surfaces are parallel to each other. The plate-like fins 9 are preferably formed from a highly thermally conductive material. Examples of such materials include copper, copper alloys, aluminum, aluminum alloys, titanium, titanium alloys, stainless steel, and the like. Heat exchanger tubes 3 extend in the horizontal direction of the cold storage box 1a and vertically penetrate the main surfaces of the multiple plate-like fins 9.

The cold storage box 1a may further comprise a fan (blowing means; not shown) for blowing air in the storage space S between the multiple plate-like fins 9. Examples of the fan include aerofoil fans, such as small electric fans and pressure ventilators; sirocco fans, turbo fans, limit load fans, and the like.

According to the cold storage box 1a of the present embodiment, heat exchange with air in the storage space S can be performed through the surface of the plate-like fins 9, in addition to the surface of the heat exchanger tubes 3. Furthermore, the area of heat exchange with the air in the storage space S can be easily enlarged by reducing the intervals between the plate-like fins 9, and increasing the number of plate-like fins 9. Accordingly, the air in the storage space S can be more efficiently cooled by the plate-like fins 9.

Further, when the air in the storage space S is blown between the plate-like fins 9 by the fan, cooled air near the surfaces of the heat exchanger tubes 3 and plate-like fins 9 can be efficiently circulated in the storage space S. This can further increase the cooling effects in the storage space S.

Figure 8:
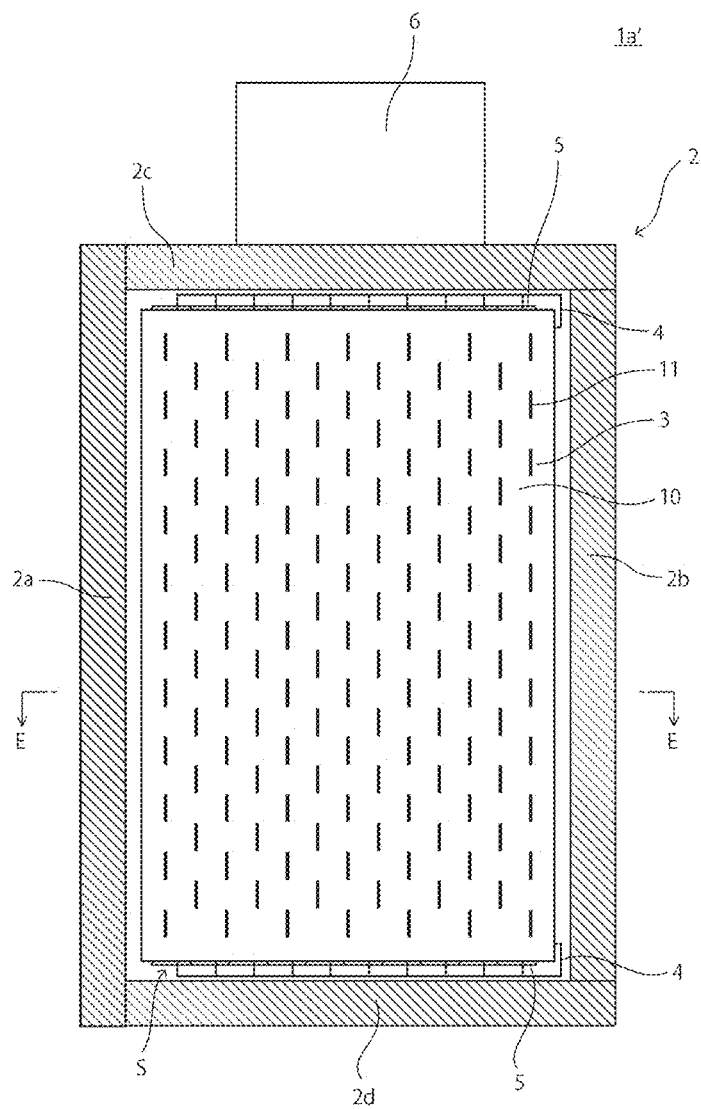
FIG. 8 is a vertical cross-sectional view showing a modified example of the cold storage box of FIG. 6.
Figure 9:
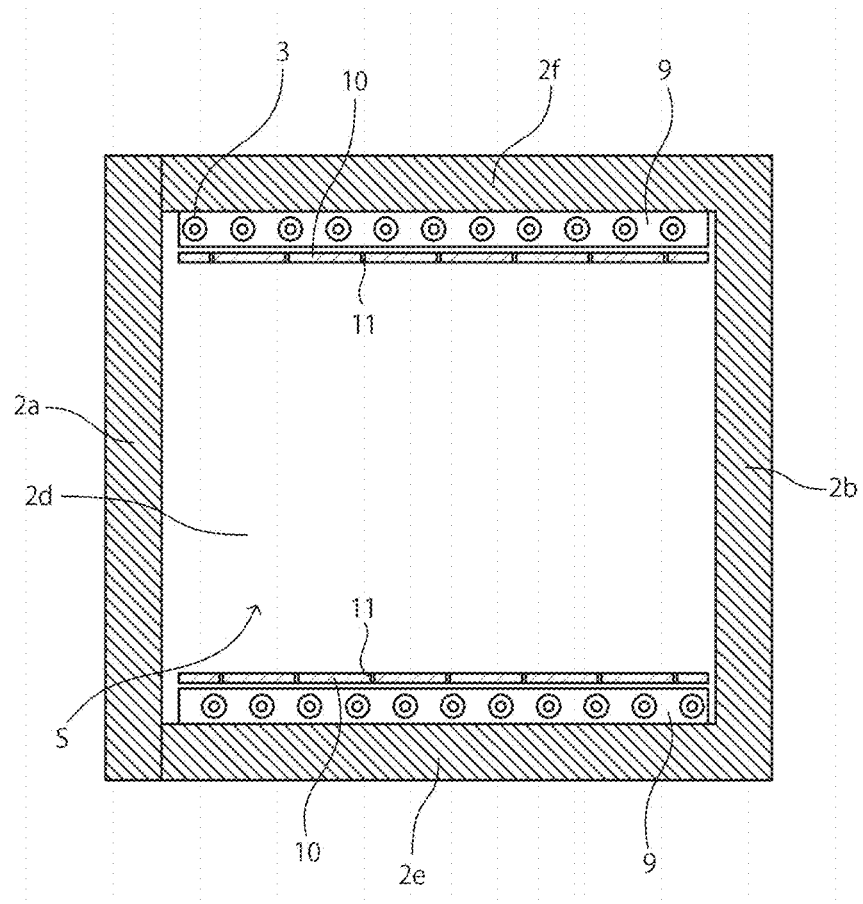
FIG. 9 is an E-E cross-sectional view (horizontal cross-sectional view) of FIG. 8.

Next, a more preferable modified example of the present embodiment is described FIGS. 8 and 9 show the internal structure of a cold storage box 1a' according to a modified example of the cold storage box 1a.

Compared with the cold storage box 1a shown in FIGS. 6 and 7, the cold storage box 1a' further comprises plates 10 facing the inner surface of the housing 2, and plate-like fins 9 are provided between the inner surface of the housing 2 and the plates 10. Specifically, the two plates 10 are provided so that they each face the right side wall 2e and the left side wall 2f, and heat exchanger tubes 3 and the plate-like fins 9 are provided between the right side wall 2e and one plate 10, and between the left side wall 2f and the other plate 10.

The plate 10 is a flat plate having a rectangular shape in plan view. The material of the plate 10 is not limited, and can be selected depending on the use of the cold storage box 1a' and the size of the storage space S. For example, the plate 10 may be formed from a plastic having a heat insulation effect, or may be formed from stainless steel, copper, a copper alloy, aluminum, an aluminum alloy, titanium, or the like that has a heat transfer effect.

When the heat exchanger tubes 3 and the plate-like fins 9 are thus covered with the plates 10, the plates 10 serve as partitions to separate the heat exchanger tubes 3 and the plate-like fins 9 from the storage space S, and the temperature near the heat exchanger tubes 3 and the plate-like fins 9 becomes lower than the temperature in the center of the storage space S. This can reduce a temperature difference between air near the surfaces of the heat exchanger tubes 3 and plate-like fins 9, and the brine solution L1 flowing through the inside of the heat exchanger tubes 3, compared with when the plates 10 are not provided. Therefore, frost is less likely to adhere to the surfaces of the heat exchanger tubes 3 and plate-like fins 9, and reduction in heat exchange efficiency caused by frost can be prevented.

The cold storage box 1a' may further comprise a fan for blowing air between the plate-like fins 9. The plates 10 can thereby prevent the air sent from the fan between the multiple plate-like fins 9 from flowing to the center of the storage space S during cooling by the heat exchanger tubes 3 and the plate-like fins 9. Therefore, the cooling effects by the heat exchanger tubes 3 and the plate-like fins 9 can be further enhanced. Accordingly, the plates 10 preferably have a size that can cover the entire heat exchanger tubes 3 and the entire plate-like fins 9, and are preferably as close as possible to the heat exchanger tubes 3 and the plate-like fins 9.

The plate 10 is preferably provided with multiple slits 11. This enables some of the air cooled by the heat exchanger tubes 3 and the plate-like fins 9 to flow in the center of the storage space S through the slits 11. As a result, an air flow that flows from the slits 11 into the storage space S is generated, in addition to an air flow that flows into the storage space S from the fan through the lower edge of the plates 10; thus, the inside of the storage space S can be efficiently and more uniformly cooled.

The cold storage box comprising the plate-like fins 9 and the plates 10 described above is suitable for refrigeration showcases in which outdoor air easily enters the storage space, and refrigerator trucks with a large storage space.

The embodiments of the present invention are described above; however, the present invention is not limited to these embodiments, and various modifications can be made as long as they do not depart from the gist of the present invention.

For example, in each of the above embodiments, the outer shape of the housing of the cold storage box is a rectangular box shape; however, the outer shape is not limited thereto, and may be a cube, a tetrahedron, a cylinder, or the like.

Moreover, in each of the above embodiments, the heat exchanger tube 3 is a double tube comprising an outer tube 3a and an inner tube 3b; however, the heat exchanger tube 3 may further comprise at least one middle tube between the outer tube and the inner tube. For example, the structure may comprise a middle tube 3e between the outer tube 3a and the inner tube 3b, as with a heat exchanger tube 3' shown in FIG. 10. In this case, a region T3 between the inner tube 3b and the middle tube 3e may be filled with a brine solution or a refrigerant.

When the second brine solution is allowed to flow in the inner tube 3b, the second brine solution may freeze or may not freeze. However, if the second brine solution freezes, the inner tube 3b may break, and so heat exchange efficiency with the brine solution L1 will decrease. For this reason, it is preferable that the second brine solution does not freeze. Accordingly, as the second brine solution, it is preferable to use a liquid that does not freeze at a temperature significantly lower than the preset temperature in the storage space S (e.g., −20° C.). When the second brine solution does not freeze, the cool storage effect is reduced after the power supply to the cold storage box is stopped; however, when the cold storage box is used as a refrigeration showcase, the refrigeration showcase is used in an environment in which electrical power is always supplied; thus, there is no problem.

Figure 11:
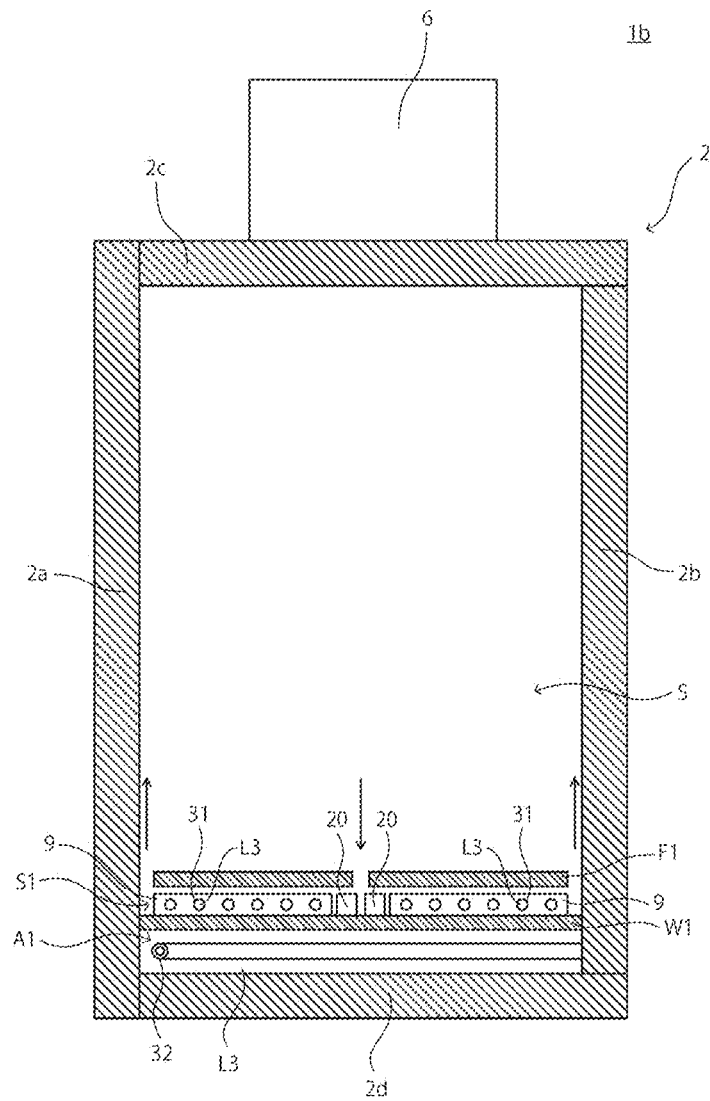
FIG. 11 is a vertical cross-sectional view of a cold storage box according to another modified example of the embodiment of the present invention.

FIG. 11 shows the internal structure of a cold storage box 1b according to another modified example of the present invention. The appearance of the cold storage box 1b is the same as that shown in FIG. 1. In this modified example, members that have the same function as that of the above embodiments are assigned the same reference signs, and detailed description of them is omitted.

The cold storage box 1b comprises at least a housing 2 internally having a storage space S for a cold storage object, a first heat exchanger tube 31 provided in the storage space S, a brine tank A1, and a second heat exchanger tube 32 provided in the brine tank A1.

The first heat exchanger tube 31 is provided on a bottom wall W1 in the storage space S, and is covered with a floor plate F1. The bottom wall W1 and the floor plate F1 face each other, and a bottom space S1 is formed between the bottom wall W1 and the floor plate F1. The storage object is placed on the floor plate F1. Gaps are formed at least partially between the edge of the floor plate F1 and the front side wall 2a, and between the edge of the floor plate F1 and the rear side wall 2b. In the present specification, the bottom space S1 is supposed to constitute part of the storage space S.

Figure 12:
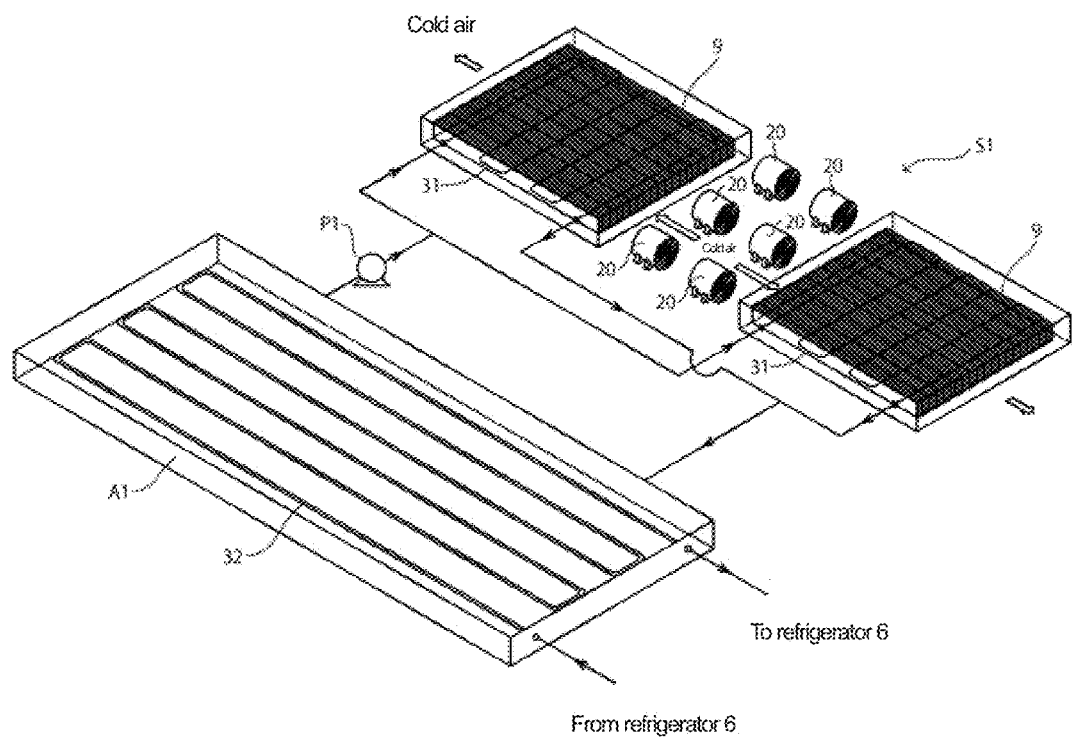
FIG. 12 is a perspective view showing part of the cold storage box of FIG. 11.

The first heat exchanger tube 31 is a single tube, and is provided so as to meander in the bottom space S1, as shown in FIG. 12. A third brine solution L3 is contained inside the first heat exchanger tube 31. The brine solution L3 is stable at a temperature almost equal to the preset cold storage temperature of the storage object, as described later.

In the bottom, space S1, multiple plate-like fins 9 and fans 20 are provided, in addition to the first heat exchanger tube 31. The plate-like fins 9 are arranged on the bottom wall W1 at predetermined intervals so that their main surfaces are parallel to each other. The first heat exchanger tube 31 meanders while penetrating these plate-like fins 9. In this modified example, the number of multiple plate-like fins 9 (hereinafter, "fin group") arranged in a prescribed direction is two, and the fans 20 are provided between one fin group and the other fin group. When the fans 20 are operated, air in the storage space S is blown between the plate-like fins 9 and circulated in the storage space S, as shown by the arrows in FIG. 11. The number and position of fans 20 are not limited, as long as the air in the storage space S can be blown between the plate-like fins 9.

The brine tank A1 is a tank for containing the brine solution L3 supplied to the first heat exchanger tube 31, and is provided below the storage space S in this modified example. The brine tank A1 and the storage space S are separated by the bottom wall W1, and the brine tank A1 is defined by the bottom wall W1 and a bottom side wall 2d.

Figure 13:
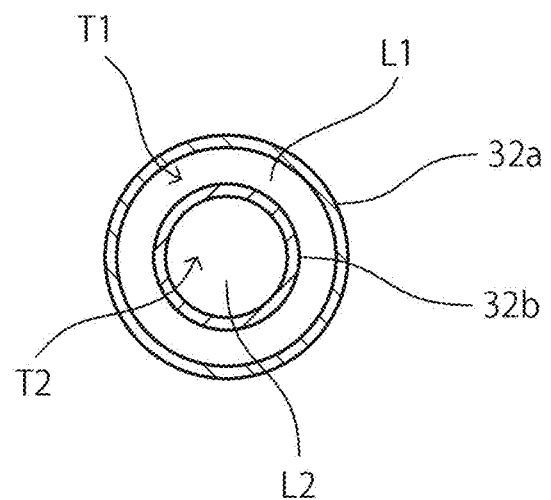
FIG. 13 is a cross-sectional view of a second heat exchanger tube.

A second heat exchanger tube 32 is provided in the brine tank A1. The second heat exchanger tube 32 is a multilayer tube having the same cross-sectional structure as that of the heat exchanger tube 3 of the above embodiments. That is, as shown in FIG. 13, the second heat exchanger tube 32 comprises an outer tube 32a with thermal conductivity having an outer surface facing the brine solution L3, and an inner tube 32b provided inside the outer tube 32a. A brine solution L1 that does not freeze at 0° C. is contained in a region T1 between the outer tube 32a and the inner tube 32b, and a refrigerant L2 is contained in a region T2 of the inside of the inner tube 3b. A second brine solution may be contained, in place of the refrigerant L2.

As shown in FIG. 12, the second heat exchanger tube 32 is provided so as to meander in the brine tank A1. In the inner tube 3b of the second heat exchanger tube 32, the refrigerant L2 is supplied from a refrigerator 6 shown in FIG. 11. The refrigerant L2 cools the brine solution L1 contained between the outer tube 32a and the inner tube 32b. Further, the brine solution L1 cools the brine solution L3 in the brine tank A1. That is, heat exchange between the refrigerant L2 and the brine solution L1, and heat exchange between the brine solution L1 and the brine solution L3, are performed. By thus performing heat exchange from the refrigerant L2 to the brine solution L3 in two steps, the temperature of the brine solution L3 can be made stable at around a desired temperature (the preset cold storage temperature of the storage object in the storage space S).

The brine tank A1 is connected to the first heat exchanger tube 31 through a pump P1. For example, the pump P1 may be buried in the rear side wall 2b. When the pump P1 is operated, the brine solution L3 flows through the first heat exchanger tube 31 in the storage space S1, and is then refluxed into the brine tank A1.

Because the brine solution L3 has a very small temperature variation, when the brine solution L3 is allowed to flow through the first heat exchanger tube 31, cold air at an almost constant temperature can be supplied into the storage space S1 through the first heat exchanger tube 31 and the plate-like fins 9. Therefore, the temperature of the storage space S1 can be easily maintained. Furthermore, the power consumption of the cold storage box 1c is can be reduced, because the number of times the refrigerator 6 is turned on and off can be lessened.

Figure 10:
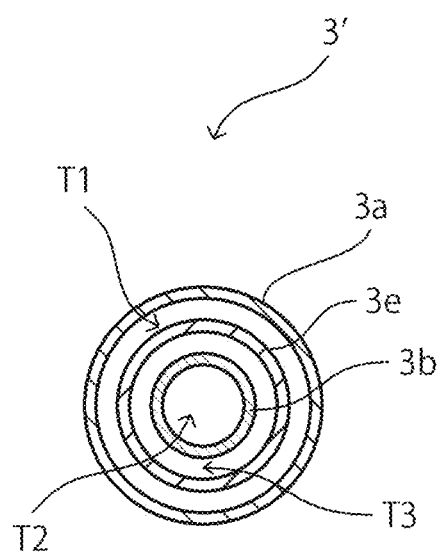
FIG. 10 is a cross-sectional view showing a modified example of a heat exchanger tube.

The positions of the first heat exchanger tube 31 and the plate-like fins 9 are not limited within the storage space S. For example, the first heat exchanger tube 31 and the plate-like fins 9 may be provided on the side walls or ceiling of the storage space S. In this case, it is not essential to provide a plate, such as the floor plate F1 that covers the first heat exchanger tube 31 and the plate-like fins 9. Moreover, the position of the brine tank A1 is also not limited within the housing 2. For example, the brine tank A1 may be provided above the storage space S. In this modified example, the second heat exchanger tube 32 is a double tube, but may be a triple tube, as shown in FIG. 10.

Figure 14:
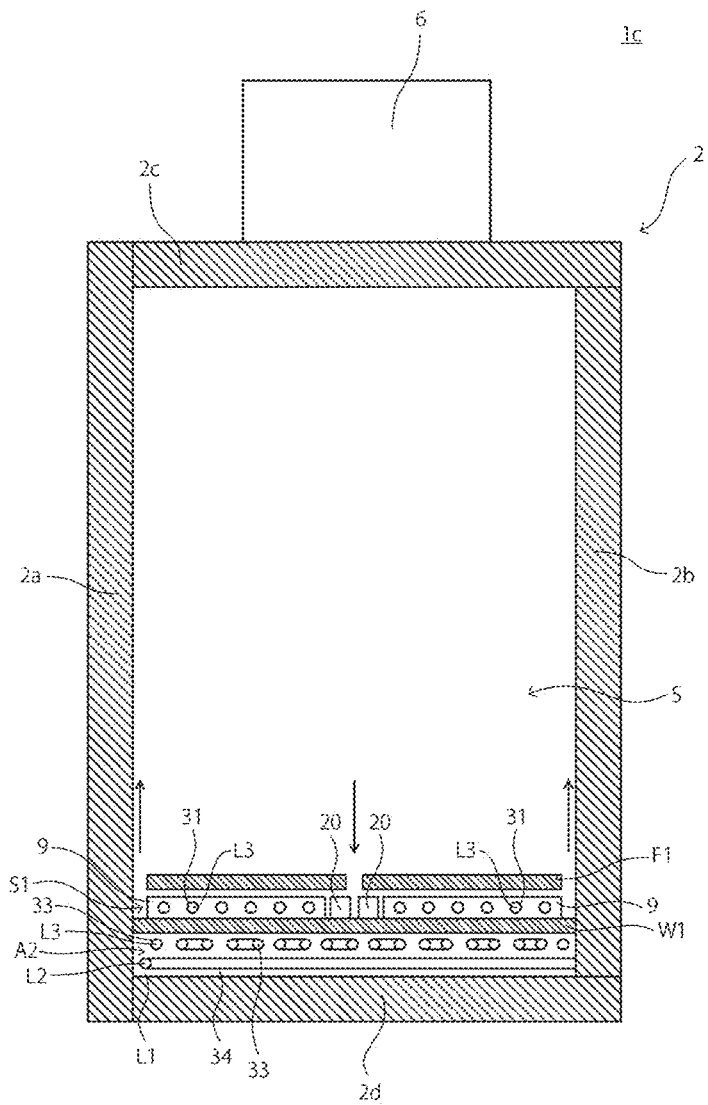
FIG. 14 is a vertical cross-sectional view of a cold storage box according to further another modified example of the embodiment of the present invention.

FIG. 14 shows the internal structure of a cold storage box 1c according to a further modified example of the present invention. The appearance of the cold storage box 1c is the same as that shown in FIG. 1. In this modified example, members having the same function as that of the above cold storage box 1b are assigned the same reference signs, and detailed description of them is omitted.

The cold storage box 1c comprises at least a housing 2 internally having a storage space S for a cold storage object, a first heat exchanger tube 31 provided in the storage space S, a brine tank A2, and a third heat exchanger tube 33 and a fourth heat exchanger tube 34 provided in the brine tank A2. The structure of the first heat exchanger tube 31, and the installation place of the first heat exchanger tube 31 are the same as those of the above cold storage box 1b. A brine solution L3 is contained inside the first heat exchanger tube 31, and the brine solution L3 is stable at a temperature almost equal to the preset cold storage temperature of the storage object.

The brine tank A2 is a tank for containing a brine solution L1, and is provided below the storage space S in this modified example. The brine tank A2 and the storage space S are separated by a bottom wall W1, and the brine tank A2 is defined by the bottom wall W1 and a bottom side wall 2d.

The brine tank A2 contains the brine solution L1, and is further provided with the third heat exchanger tube 33 and the fourth heat exchanger tube 34. The third heat exchanger tube 33 and the fourth heat exchanger tube 34 are both single tubes.

Figure 15:
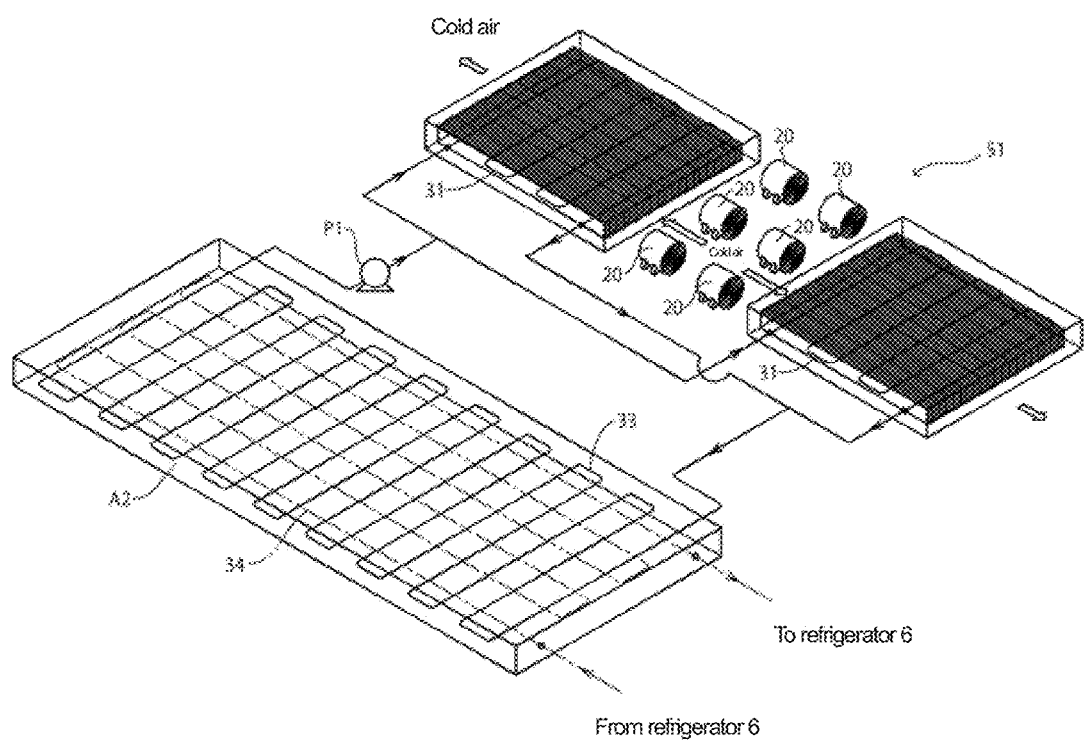
FIG. 15 is a perspective view showing part of the cold storage box of FIG. 14.

As shown in FIG. 15, the third heat exchanger tube 33 is provided so as to meander in the brine tank A, and is connected to the first heat exchanger tube 31 through a pump P1. Accordingly, the brine solution L3 flows in the third heat exchanger tube 33, as with the first heat exchanger tube 31.

The fourth heat exchanger tube 34 is also provided so as to meander in the brine tank A1. In the fourth heat exchanger tube 34, a refrigerant L2 (or a second brine solution) is supplied from a refrigerator 6 shown in FIG. 14. The refrigerant L2 cools the brine solution L1 contained in the brine tank A1. Further, the brine solution L1 cools the brine solution L3 contained in the third heat exchanger tube 33. That is, as with the above cold storage box 1b, heat exchange between the refrigerant L2 and the brine solution L1, and heat exchange between the brine solution L1 and the brine solution L3 are performed in two steps. Therefore, the temperature of the brine solution L3 can be made stable at around a desired temperature (the preset cold storage temperature of the storage object in the storage space S).

Accordingly, in this modified example, when the brine solution L3 is allowed to flow in the first heat exchanger tube 31, cold air at an almost constant temperature can be supplied into the storage space S1 through the first heat exchanger tube 31 and the plate-like fins 9. Therefore, the temperature of the storage space S1 can be easily maintained. Furthermore, the power consumption of the cold storage box 1c can be reduced, because the number of times the refrigerator 6 is turned on and off can be lessened.

INDUSTRIAL APPLICABILITY

The cold storage box according to the present invention can be applied to refrigerator trucks, cold storage containers (air cargo, marine containers, and railroad containers), large cold storage warehouses, refrigeration showcases, small cold storage containers, and the like.

REFERENCE SIGNS LIST

1. Cold storage box
1'. Cold storage box
1a. Cold storage box
1a'. Cold storage box
1b. Cold storage box
1c. Cold storage box
2. Housing
2a. Front side wall 2b. Rear side wall
2c. Upper side wall
2d. Bottom side wall
2e. Right side wall
2f. Left side wall
3. Heat exchanger tube
3'. Heat exchanger tube
3a. Outer tube
3b. Inner tube
3c. Connecting member
3d. Curved portion
3e. Middle tube
4. Brine solution supply pipe
5. Refrigerant supply pipe
6. Refrigerator
7. Caster
8. Handle
9. Plate-like fin
10. Plate
11. Slit
31. First heat exchanger tube
32. Second heat exchanger tube
32a. Outer tube
32b. Inner tube
33. Third heat exchanger tube
34. Fourth heat exchanger tube
A1. Brine tank
A2. Brine tank
L1. Brine solution (first brine solution)
L2. Refrigerant
L3. Brine solution (third brine solution)
P1. Pump
S. Storage space
T1. Region (between the outer tube and the inner tube)
T2. Region (inside of the inner tube)
T3. Region (between the middle tube and the inner tube)
W1. Partition

The invention claimed is:

1. A cold storage box comprising:
a housing internally having a storage space for a cold storage object,
one or more first heat exchanger tubes provided in the storage space and containing a second brine solution,
a brine tank containing the second brine solution supplied to the first heat exchanger tubes, and
one or more second heat exchanger tubes provided in the brine tank;
wherein the second heat exchanger tubes are each a multilayer tube comprising:
an outer tube with thermal conductivity having an outer surface facing the second brine solution, and
an inner tube provided inside the outer tube;
a first brine solution that does not freeze at 0° C. is contained between the outer tube and the inner tube; and
a refrigerant is contained inside the inner tube.

2. The cold storage box according to claim 1, further comprising multiple plate-like fins provided in the storage space;
wherein the one or more first heat exchanger tubes penetrate the plate-like fins.

3. The cold storage box according to claim 2, further comprising a blowing means for blowing air in the storage space between the plate-like fins.

4. The cold storage box according to claim 1, wherein the inner tube is formed from cold-resistant rubber, plastics, foamed resins, ceramics, or glass, each of which is coated with copper, titanium, stainless steel, aluminum, or an aluminum alloy.

5. The cold storage box according to claim 1, wherein the inner tube has a multilayer structure having an air layer therein.

* * * * *